(12) United States Patent
Kikuchi

(10) Patent No.: US 9,164,714 B2
(45) Date of Patent: Oct. 20, 2015

(54) INFORMATION PROCESSING APPARATUS, METHOD, AND PROGRAM FOR CONTROLLING A USER INTERFACE

(71) Applicant: CANON KABUSHIKI KAISHA, Tokyo (JP)

(72) Inventor: Hiroshi Kikuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/374,511

(22) PCT Filed: Jan. 17, 2013

(86) PCT No.: PCT/JP2013/000194
§ 371 (c)(1),
(2) Date: Jul. 24, 2014

(87) PCT Pub. No.: WO2013/111536
PCT Pub. Date: Aug. 1, 2013

(65) Prior Publication Data
US 2014/0362409 A1    Dec. 11, 2014

(30) Foreign Application Priority Data
Jan. 25, 2012   (JP) .................................. 2012-013039

(51) Int. Cl.
*G06F 15/00* (2006.01)
*G06K 1/00* (2006.01)
*G06F 3/12* (2006.01)
*G06F 3/048* (2013.01)
*G06F 21/60* (2013.01)
*G06F 21/84* (2013.01)

(52) U.S. Cl.
CPC .............. *G06F 3/1253* (2013.01); *G06F 3/048* (2013.01); *G06F 3/1203* (2013.01); *G06F 3/1222* (2013.01); *G06F 3/1238* (2013.01); *G06F 3/1254* (2013.01); *G06F 3/1285* (2013.01); *G06F 21/608* (2013.01); *G06F 21/84* (2013.01)

(58) Field of Classification Search
None
See application file for complete search history.

(56) References Cited

U.S. PATENT DOCUMENTS

| | | | |
|---|---|---|---|
| 6,574,002 B1 * | 6/2003 | Paczewitz | 358/1.13 |
| 8,132,230 B2 * | 3/2012 | Akita | 726/2 |
| 2011/0093836 A1 * | 4/2011 | Galicia et al. | 717/139 |

(Continued)

FOREIGN PATENT DOCUMENTS

| | | |
|---|---|---|
| JP | P2001-318779 A | 11/2001 |
| JP | P2004-030581 A | 1/2004 |
| JP | P2006-164042 A | 6/2006 |

OTHER PUBLICATIONS

"How do I boot my windows XP into safe mode" <http://robinmonks.com/2011/11/how-do-i-boot-my-windows-xp-windows-vista-or-windows-7-pc-into-safe-mode/> published Nov. 23, 2011.*

*Primary Examiner* — Ming Hon
(74) *Attorney, Agent, or Firm* — Canon U.S.A., Inc. IP Division

(57) ABSTRACT

An information processing apparatus which operates an operating system providing a first user interface environment appropriate for a touch panel and a conventional desktop user interface environment automatically executes processing by using information set as a default value, if an operation by a user on a pop-up dialog, which is displayed in the desktop user interface environment and is related to functions including a secure print function provided by a printer driver, is not performed for a predetermined period of time.

6 Claims, 14 Drawing Sheets

(56) References Cited

U.S. PATENT DOCUMENTS

2012/0212758 A1* 8/2012 Eom et al. .................. 358/1.13
2013/0063753 A1* 3/2013 Mitsui ........................ 358/1.13
2013/0182286 A1* 7/2013 Tarumi ....................... 358/1.15
2014/0300928 A1* 10/2014 Hirakawa ................... 358/1.15
2015/0012882 A1* 1/2015 Hasama ...................... 715/808

* cited by examiner

INFORMATION PROCESSING APPARATUS, METHOD, AND PROGRAM FOR CONTROLLING A USER INTERFACE

TECHNICAL FIELD

The present invention relates to a technique useful for print processing performed by an information processing apparatus.

BACKGROUND ART

A printer is controlled by software called a printer driver which normally runs on a client computer. The printer driver has two major functions. One function allows a user to perform a print setting. Generally, the function includes a user interface (UI). The other function converts a rendering instruction sent from an application into print data (in page description language (PDL)) which can be interpreted by the printer, and transmits the data to the printer. These functions are realized in cooperation with an operating system (OS) on the client computer.

Further, the printer driver has a function called secure print, which is discussed in Japanese Patent Application Laid-Open No. 2001-318779. This function allows the user to input a password before printing is performed with the printer. When the user provides a print instruction, the printer driver automatically displays a pop-up dialog on the screen of the client computer, prompting the user to input a password. The secure print is realized by adding the input information to the print data.

When specifications of an OS, which generally cooperates with the printer driver, are changed, the user may find difficulty in using the functions realized by the printer driver or may not be able to use the functions. Examples of the OS specification change include an OS design that employs a new UI optimized for touch-panel devices such as a smartphone. When such a new OS is used, only a part of the functions, which is associated with the UI provided by the printer driver for the previous OS, are supported by the new UI. The functions not supported by the UI are, for example, executed on the new OS on a different screen, which is provided for a previous application. However, in many exceptional UI functions such as an automatic pop-up dialog (e.g. the above-described secure print), usability thereof is not fully considered for the new OS.

As examples of similar exceptional UI functions provided by a printer driver, there are dialogs requesting department information for departmental management and designation of a file path for a file storage setting. A similar UI function is used for address designation in a facsimile driver.

SUMMARY OF INVENTION

The present invention is directed to an information processing apparatus which is capable of appropriately executing a function provided by a printer driver such as a secure print function, even if a user does not fully understand a display function for a new OS such as an OS for a touch-panel device.

According to an aspect of the present invention, an information processing apparatus including a control unit configured to execute an operating system (OS) providing a first user interface (UI) environment appropriate for a touch panel and a second UI environment different from the first UI environment and a device driver configured to control an image forming apparatus includes a setting unit configured to set, in advance, information to be set via a pop-up dialog in the second UI environment as a function of the device driver, before a request to the image forming apparatus is executed, a control unit configured to pop up the dialog in the second UI environment as a function of the device driver according to execution of the request to the image forming apparatus, and an execution unit configured to execute processing regarding the request by using the information set by the setting unit if an operation by a user on the dialog in the second UI environment is not performed for a predetermined period of time.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Figure 1:
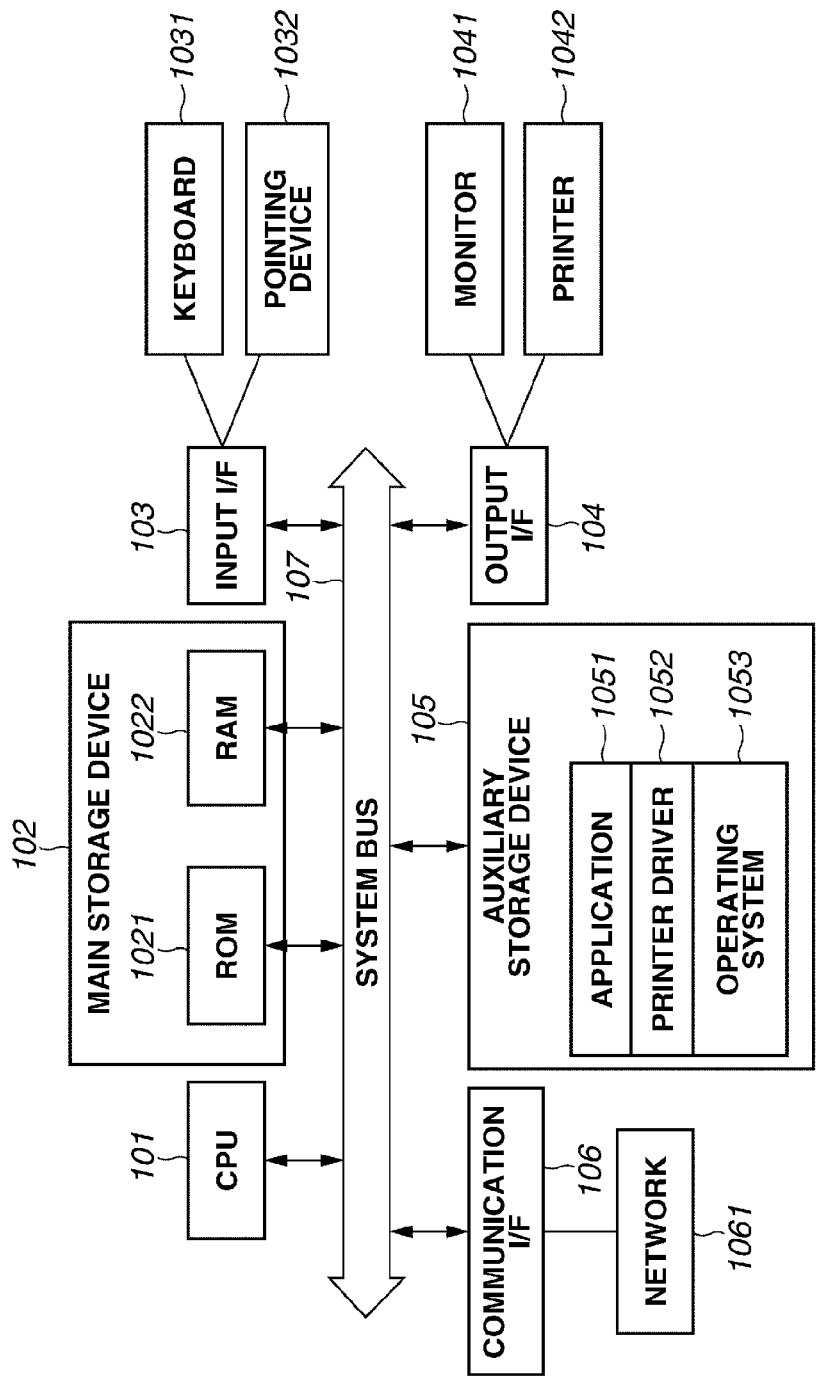
FIG. 1 illustrates a configuration example of hardware and software of an information processing apparatus according to a first exemplary embodiment of the present invention.

FIG. 1 illustrates a configuration example of hardware and software of an information processing apparatus according to a first exemplary embodiment of the present invention. The information processing apparatus includes, for example, a client computer. A printer driver runs on the client computer. Except where specifically noted, as long as a function of the present invention is executed, the present invention can be applied not only to a single apparatus but to a system including a plurality of apparatuses or to a system which is connected to a network.

In FIG. 1, a CPU 101 executes a program stored in a ROM 1021 or a RAM 1022 in a main storage unit 102 or stored in an auxiliary storage unit 105 and controls the entire information processing apparatus. The RAM 1022 is used as a work area when the CPU 101 performs various types of processing. The auxiliary storage unit 105 stores various programs including an operating system (OS) 1053 and an application 1051.

An input device such as a keyboard 1031 and a pointing device 1032 represented by a mouse or a touch panel is used by the user to provide various instructions to a client computer via an input I/F (interface) 103. An output I/F 104 is used for outputting data to an external device. For example, the output I/F 104 outputs data to an output device such as a monitor 1041 or a printer 1042. Although the information processing apparatus is directly connected to the printer 1042 in FIG. 1, the apparatus can be connected to the printer on a network 1061 via a communication I/F 106. Further, the interfaces and the modules of the information processing apparatus exchange data via a common data system bus 107.

Figure 2:
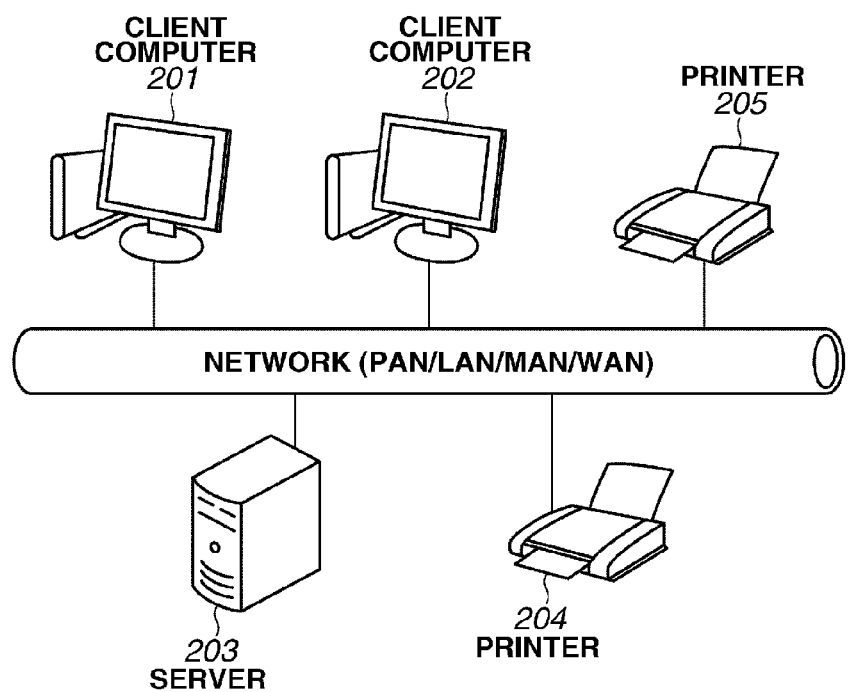
FIG. 2 illustrates a configuration example of a network according to the first exemplary embodiment.

FIG. 2 illustrates a configuration example of a network applicable to the present exemplary embodiment. Client computers 201 and 202 which provide print instructions and printers 204 and 205 are connected to one or a plurality of networks. Further, a server computer 203 that manages the client computers and the printers can be connected to such networks. Although the printer 205 is physically connected to the network, if the printer is in an offline state, the printer cannot actually be used. A variety of networks, from small scale to large scale networks, such as a local area network (LAN) and a wide area network (WAN), are included in the above-described networks. All the apparatuses in FIG. 2 are connected to the networks. The server and the printers can be connected via the Internet by the use of, for example, cloud computing.

Figure 3:
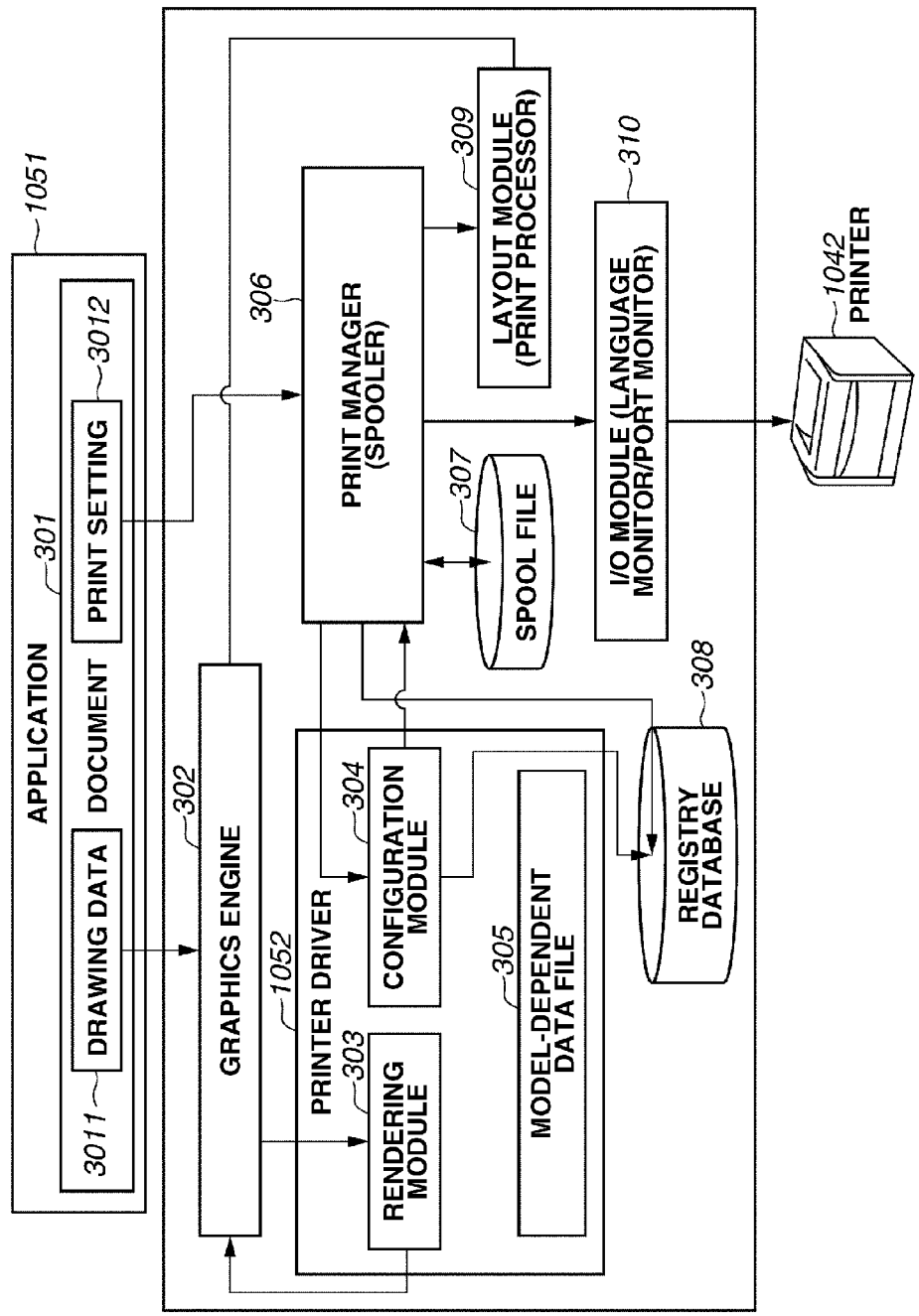
FIG. 3 illustrates a configuration example of a print processing system of a client computer according to the first exemplary embodiment.

FIG. 3 illustrates an example of a print processing system of the information processing apparatus. The application 1051, a printer driver 1052, and the OS 1053 are stored in the auxiliary storage unit 105. A graphics engine 302 and a print manager 306 include logic modules provided as the functions of the OS 1053.

When the user prints a document 301, the user gives an instruction to the information processing apparatus by using the UI of the application 1051 displayed on the monitor 1041 with an input device such as the keyboard 1031 or the pointing device 1032. The print processing is executed by performing three types of processing, which are selecting the printer, generating the print setting, and converting drawing data.

Regarding the selection of the printer, the user selects an icon indicative of a print queue of the printer driver corresponding to the printer which the user desires to use. In FIG. 3, when the printer driver 1052 is installed on the client computer, the printer driver 1052 is associated with the print queue and the icon indicative of the print queue is provided for the user.

To generate the print setting, the function of the printer driver 1052 is used. First, an initial value is generated by a configuration module 304. Then, by using a user interface (UI) of the application 1051 or the printer driver 1052, the user changes the setting as appropriate and determines a print setting 3012. For example, the user changes the size of paper to be output or designates two-sided printing or monochrome/color printing.

The user interface of the printer driver 1052 is provided by the configuration module 304. The print setting 3012 is reserved in the RAM 1022. The format of the print setting 3012 is, for example, a binary data structure or an XML in a markup language. The format depends on the specification of the printer driver 1052 and the OS 1053. Further, the print setting 3012 is generated each time a document is printed. However, useful information such as an optional device configuration of the printer 1042 and environment settings set for each user are stored in a registry database 308 of the OS 1053 by the printer driver 1052. Further, default values for each user in the print setting 3012 are stored in the registry database 308 by the print manager 306 of the OS 1053.

Next, conversion of the drawing data will be described. If print processing is executed by the user after the generation of the print setting 3012, the application 1051 notifies the OS 1053 of start of printing. Then, print data is generated by the designated printer driver 1052 via the graphics engine 302 of the OS 1053. If layout processing is designated in the print setting 3012, a spool file 307, which is a temporary file, is generated before the data is processed by a rendering module 303 of the printer driver 1052. Then, a layout module 309 starts layout processing which includes changing a paper order and making an N-up printing. After the layout is changed by the layout module 309, the rendering module 303 of the printer driver 1052 converts the drawing data into PDL data which can be understood by the printer. When the drawing data is converted into PDL data, the print setting 3012 is also converted into PDL data. In many cases, both the rendering module 303 and the configuration module 304 are shared and can be used by a plurality of types of printers (the printers 1042). The difference between the models is described in a model-dependent data file 305. The rendering module 303 and the configuration module 304 refer to this model-dependent data file 305 as appropriate. The data which has been converted is sequentially stored as the spool file 307. The print manager 306 acquires the spool file 307 and manages the schedule of the print processing as a print job. When the printer is ready for printing, the print manager 306 transmits the print job to the printer 1042 via an I/O module 310. In this manner, the data provided by the application is transmitted to the printer as a print job and printing is executed.

Figure 5:
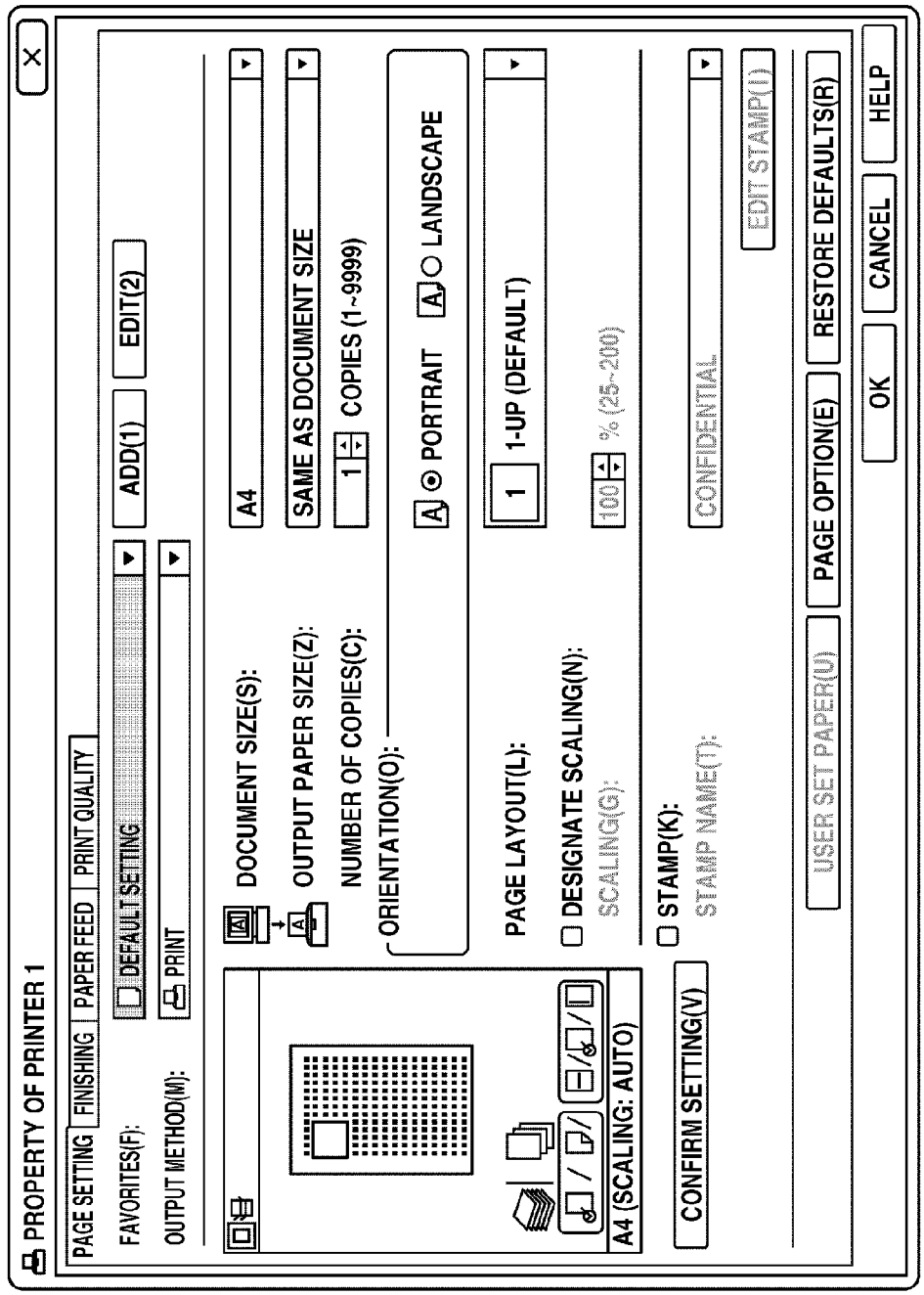
FIG. 5 illustrates an example of a user interface used for a print setting provided by a printer driver according to the first exemplary embodiment.

In generating the print setting 3012 of a document 301 illustrated in FIG. 3, the print setting 3012 is directly rewritten by the application. Further, the print setting 3012 can be generated using a user interface. The user interface is provided by the configuration module 304 of the printer driver 1052. FIG. 5 illustrates an example of a user interface provided by the configuration module 304 of the printer driver 1052.

Figure 4:
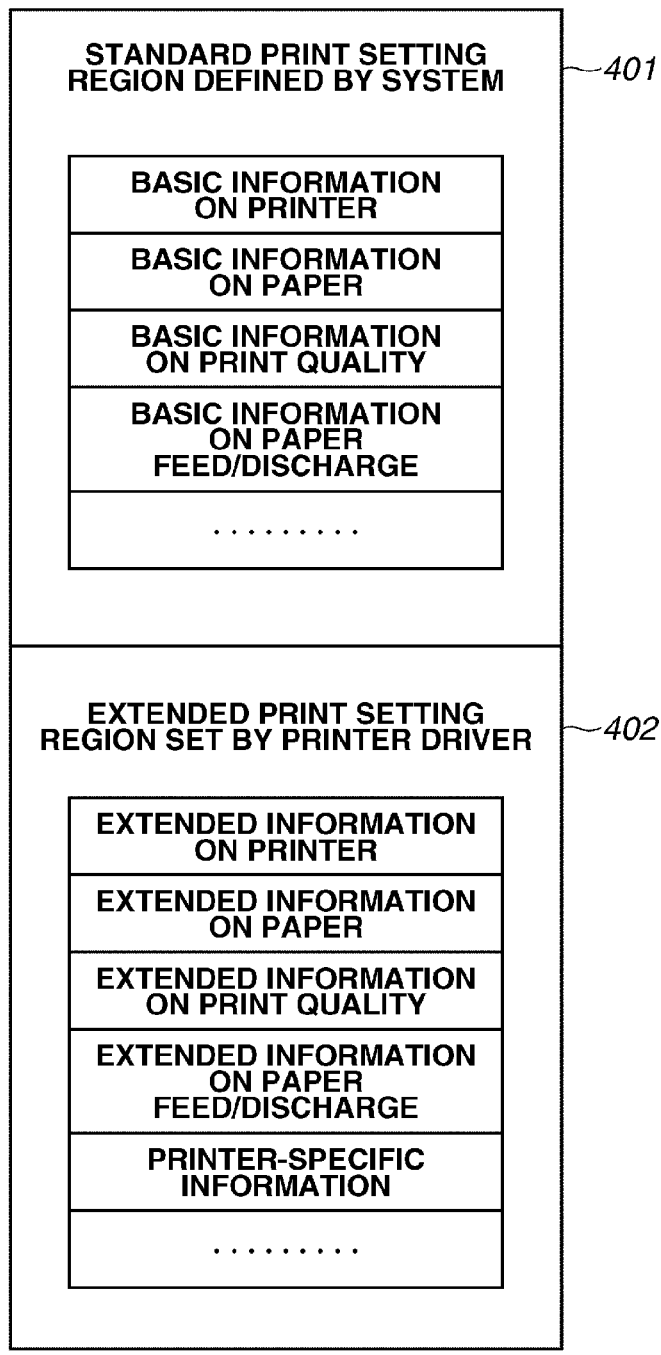
FIG. 4 illustrates a data structure of a DEVMODE structure according to the first exemplary embodiment.

The print setting 3012 includes a structure called a DEVMODE structure on a Microsoft (registered trademark) Windows (registered trademark) OS. The DEVMODE structure is illustrated in FIG. 4. The DEVMODE structure includes two regions, which are a standard setting region 401 and an extended setting region 402. The standard setting region 401 is publicly defined by the OS and the setting region 402 is a region extended by the printer driver. Various print settings including changing a paper size or a paper-feed stage, and switching color/monochrome printing can be performed in the standard setting region 401. In the setting region 402, optional settings associated with a discharge function and a fine color adjustment function of the printer can be performed. Since information on the extended settings on the printer driver 1052 is not provided to the application, the application can only change the print settings performed in the standard setting region 401 defined by the system. Thus, generally, the application causes the printer driver 1052 to display a user interface so that the user can perform the print settings in the extended setting region 402.

The configuration module 304 provides not only the user interface but also an application programming interface (API). Thus, it is possible to perform the print settings in the extended setting region 402 from an external apparatus without displaying the user interface. However, if an API of the configuration module 304 is used, the application needs to correspond to the printer driver 1052. Therefore, in a common application, only the print settings in standard setting region 401 are changed.

Next, the OS 1053 described above with reference to FIG. 1 will be described in detail together with the issues to be solved by the present invention.

In recent years, mobile terminals (e.g., cellular phones) and tablet computers including a touch panel have widely been used. Since these devices are operated by touching the screen, the UI environment of the OS of these devices is optimized for a touch panel. Such a UI environment (hereinafter referred to as a touch-panel UI) is different from a UI environment optimized for, for example, the conventional Windows (registered trademark) XP (hereinafter referred to as a desktop UI).

Figure 9:
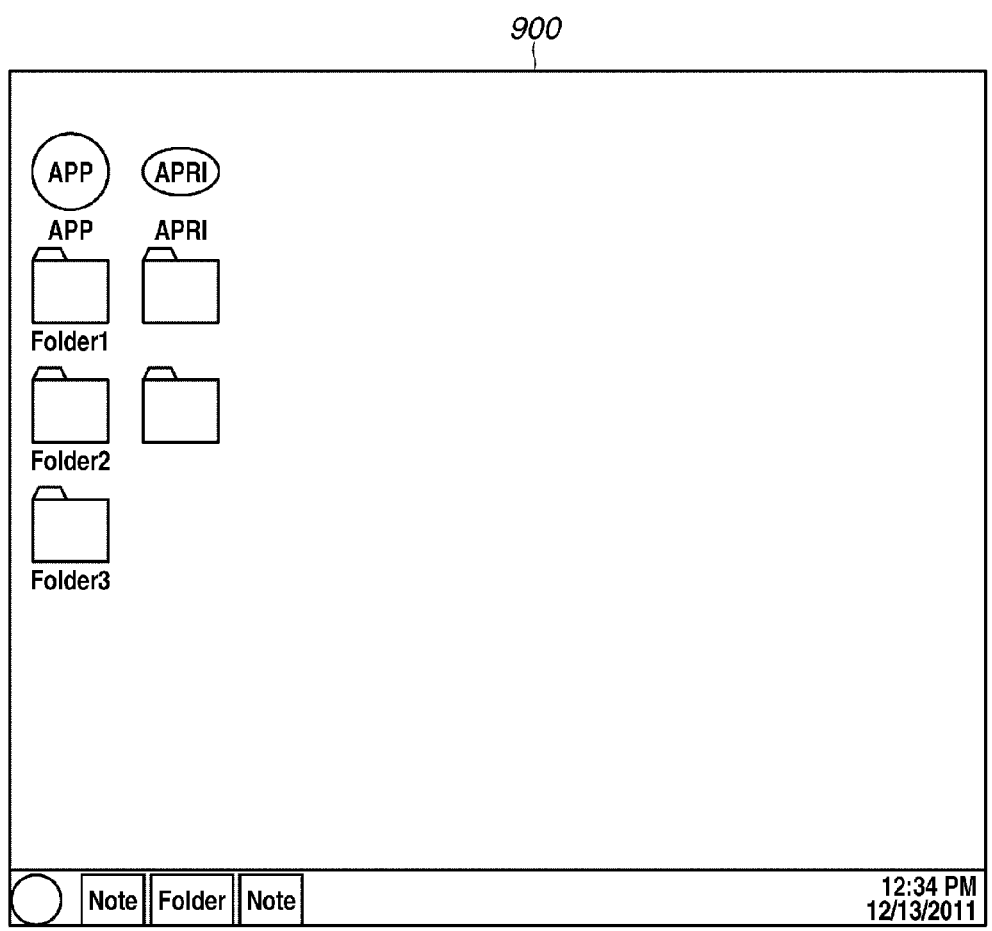
FIG. 9 illustrates an example of a desktop user interface according to the first exemplary embodiment.

FIG. 9 illustrates an example of a desktop UI. The conventional UI screen (FIG. 5) for a printer driver is displayed in such a UI environment.

Figure 10:
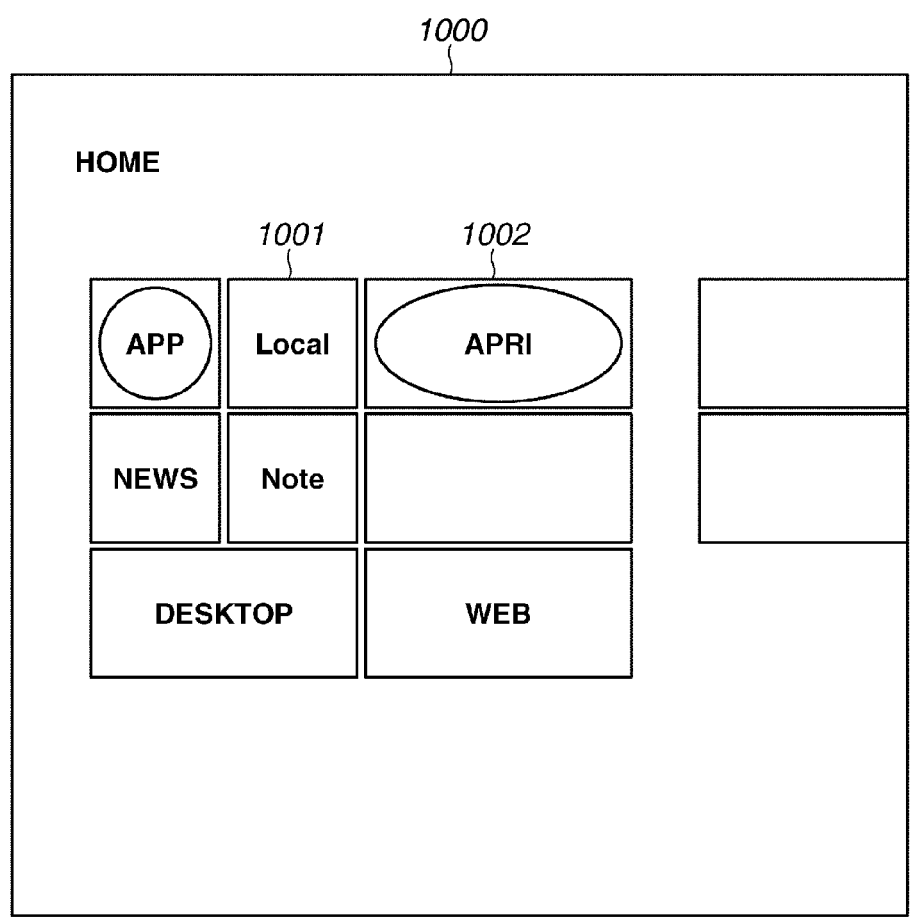
FIG. 10 illustrates an example of a touch-panel user interface according to the first exemplary embodiment.

FIG. 10 illustrates an example of a touch-panel UI. In FIG. 10, the size of the buttons (e.g., buttons 1001 and 1002) of a touch-panel UI 1000 is optimized and arranged for use with a finger.

An OS on which the display of the touch-panel UI 1000 can be manually changed to a desktop UI 900 can also be assumed. To generate an application that runs on such an OS, a different package needs to be prepared for each UI environment.

According to the present invention, the OS 1053 enables switching between the touch-panel UI 1000 and the desktop UI 900.

The OS 1053 allows compatibility so that when a print request from a document application conforming to the touch-panel UI 1000 is received, the user can manually switch the UI screen for the touch-panel UI 1000 to the UI screen for the printer driver 1052 (see FIG. 5) conforming to the environment of the desktop UI 900. Accordingly, even on the OS 1053, the user can use the printer driver 1052 designed for the conventional UI environment and perform printing.

However, if the UI 900 of a printer driver assuming such a conventional UI environment is displayed, although the necessary content is displayed, the operability is not good. This is because the buttons for the conventional UI environment generally used with a mouse and a keyboard are too small for a user to use a device generally operated on a touch panel.

Figure 11:
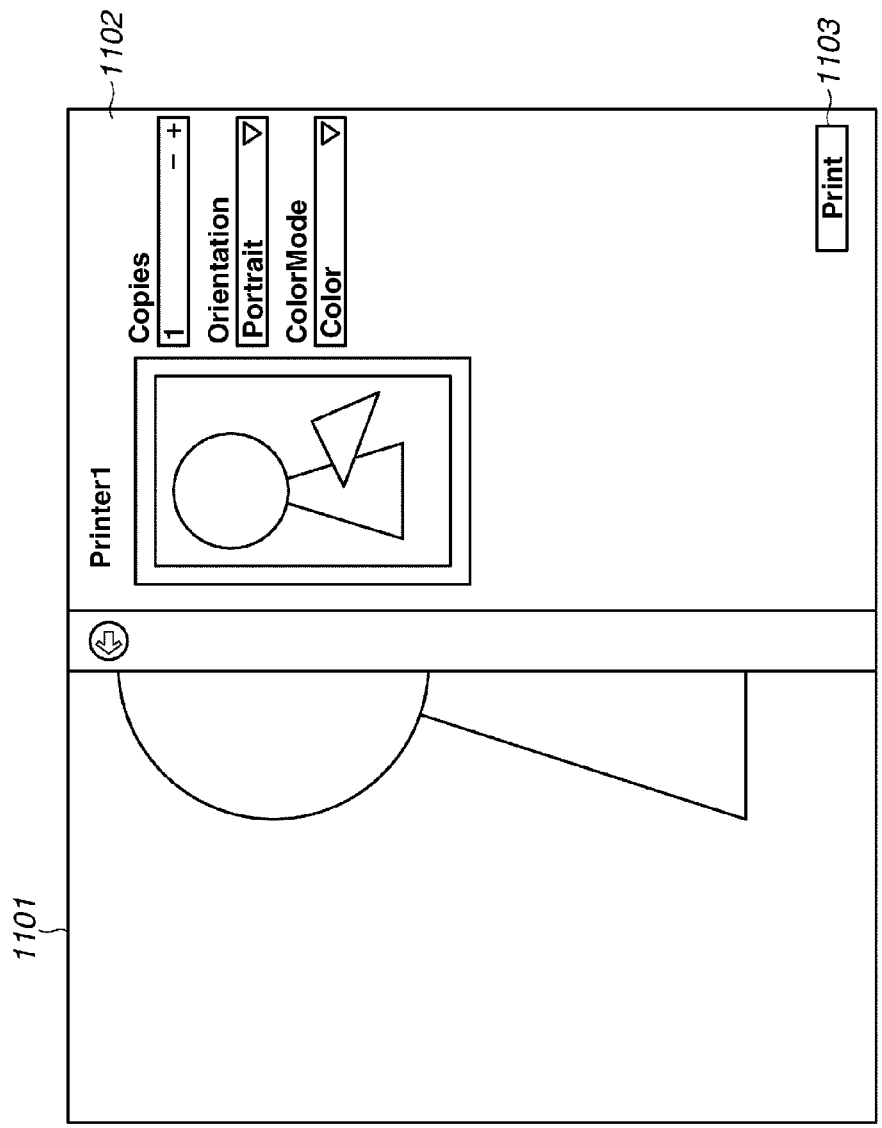
FIG. 11 is an example of a user interface automatically generated by an OS based on an application for the touch-panel UI and metadata in an extensible mark-up language (XML) format according to the first exemplary embodiment.

Thus, when a print request from a document application conforming to the touch-panel UI 1000 is received, instead of directly displaying the UI 900 of the printer driver, the OS 1053 automatically generates a UI based on metadata in the XML format so that the user can easily perform the necessary print setting. FIG. 11 illustrates an example of a UI 1101 of an application conforming to the touch-panel UI 1000 and a UI 1102 for a print setting automatically generated by the OS 1053 based on metadata in the XML format according to the present exemplary embodiment.

However, since the UI 1102 is not a module provided by a printer vendor but generated by the OS 1053, the user can specify only a part of the print settings on the UI 1102. In other words, the secure print function or the departmental management function requesting the user to input information (e.g., user information, authentication information), which has been provided by the printer driver 1052, is not provided on the UI 1102. The function displays a pop-up dialog prompting the user to input user information when the user presses a "Print" button 1103. The structure of the OS 1053, which automatically generates a UI based on the metadata in the XML format, cannot support such a function of the printer driver 1052.

Thus, if the user desires to use the secure print function or the departmental management function, the user needs to follow the following procedures. First, the user needs to set the secure print function or the departmental management function using the UI screen of the printer driver in the conventional UI environment. Next, as described above, when the user provides the printing instruction, a pop-up dialog prompting the user to input information needs to be displayed on the desktop UI 900 in the conventional UI environment. However, since the touch-panel UI 1000 is displayed on the monitor 1041 screen before and after the user provides the printing instruction. In order for the user to know that a pop-up UI is displayed on the desktop UI 900, the user needs to manually change the touch-panel UI 1000 to the desktop UI 900 after providing the printing instruction.

Figure 12:
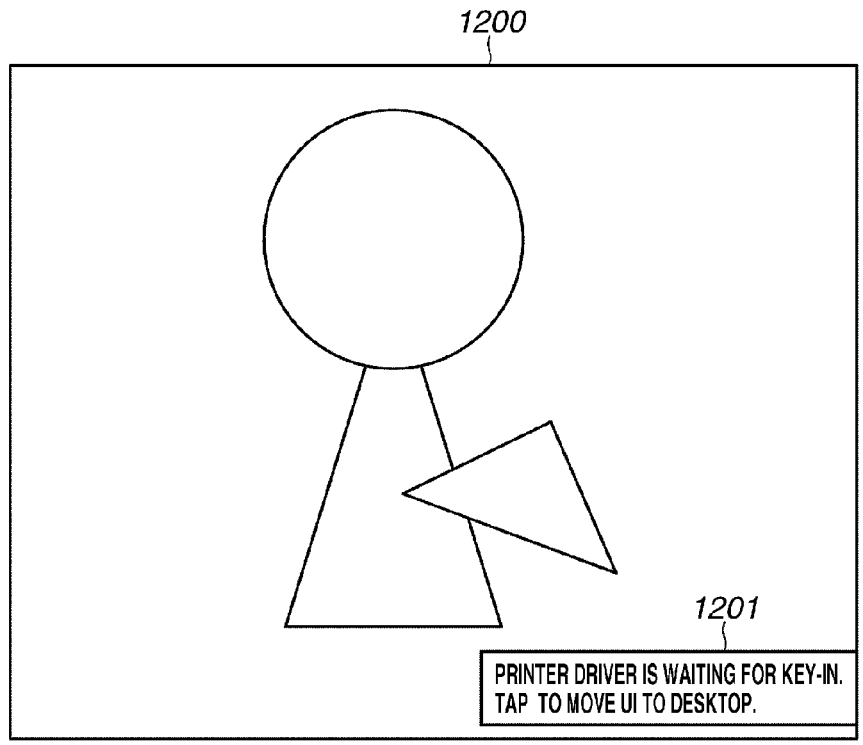
FIG. 12 illustrates an example of a toast for the touch-panel UI according to the first exemplary embodiment.

Thus, when the printer driver 1052 displays a pop-up UI on the desktop UI 900 after the instruction of the printing, the OS 1053 displays a toast prompting the user to tap the touch-panel UI 1000. FIG. 12 illustrates an example of the toast according to the present exemplary embodiment.

In FIG. 12, a toast 1201 is displayed on an application 1200 in a touch-panel UI. The toast 1201 includes a message indicating that the touch-panel UI 1000 can be changed to the desktop UI 900 if the user taps the toast 1201. If the user taps the toast 1201, the OS 1053 changes the touch-panel UI 1000 to the desktop UI 900. Accordingly, the user can notice the pop-up UI displayed on the desktop UI 900, input necessary information, and continue the print processing.

However, the display control of the toast 1201 by the OS 1053 needs to be supported not only by the printer driver but by various conventional applications which the OS ensures compatibility. Some of pop-up dialogs displayed on the desktop UI 900, which is not displayed on the touch-panel UI 1000, may not require confirmation by the user. If user confirmation is not necessary, the toast 1201, which continues to be displayed until the toast 1201 is tapped by the user, indicates that the display area on the touch-panel UI 1000 is unnecessarily occupied.

Thus, normally, the toast 1201 is used only as a temporary notification displayed by the OS 1053 and disappears after the elapse of a predetermined period of time. On the other hand, to execute the function of the printer driver such as the above-described secure print function and the departmental management function, the input of user information is necessary. Thus, if the user misses the toast 1201, the printer driver 1052 continues to display a pop-up UI on the desktop UI 900 to wait for the input about necessary information, and the user is unable to know that the print processing is not being performed although the print processing is suspended.

Thus, if the user does not fully understand the display function of the OS 1053, some of functions of the printer driver may not be appropriately executed. According to the present exemplary embodiment, the user can make full use of the functions of the printer driver running on the OS 1053 that supports more than one UI environment.

Figure 6:
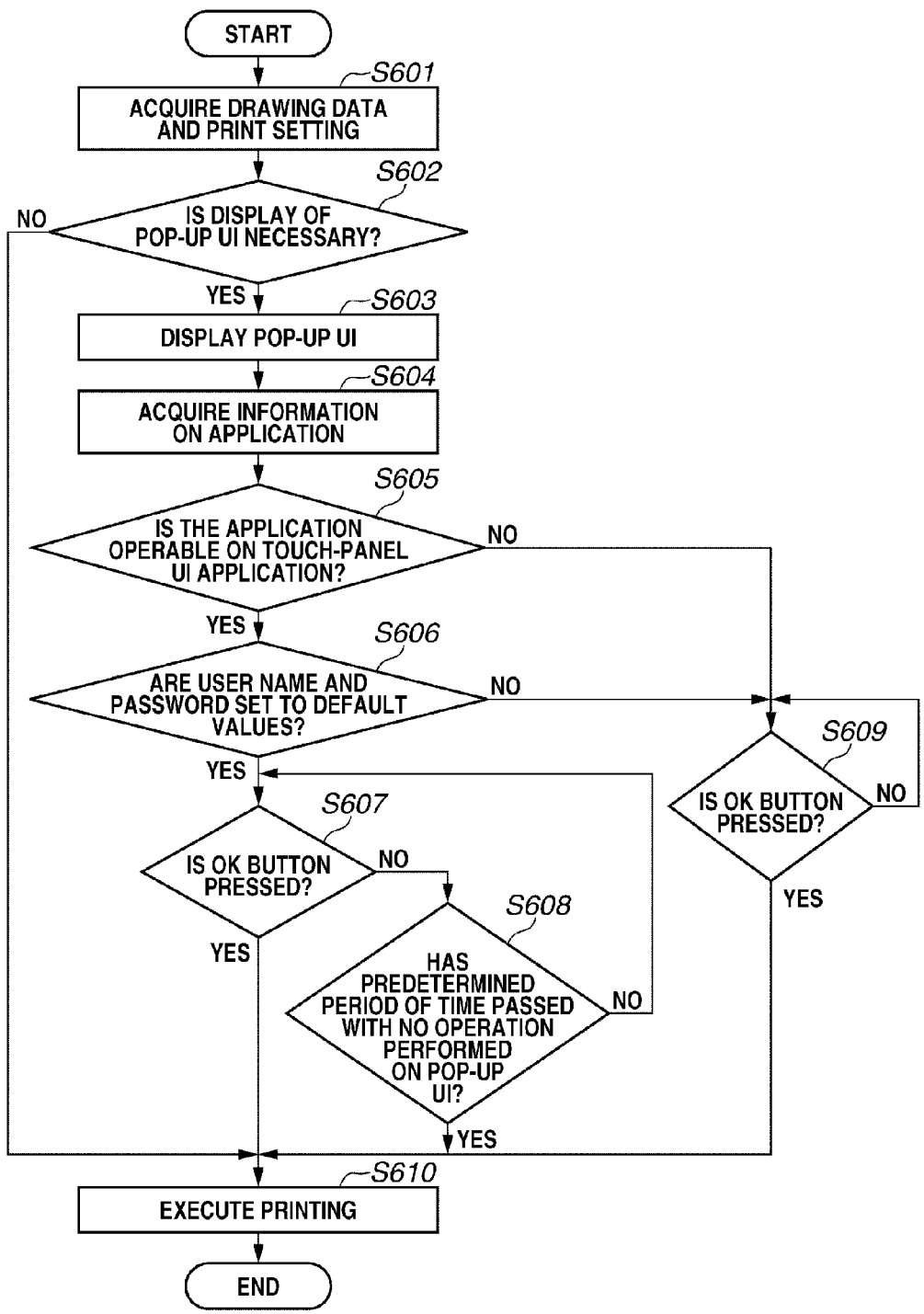
FIG. 6 is a flowchart illustrating the print processing using the printer driver according to the first exemplary embodiment.

The above-described processing will be described with reference to FIG. 6. FIG. 6 is a flowchart illustrating the print processing of the printer driver 1052 according to the present exemplary embodiment. The program (i.e., the printer driver) of this processing is stored in the auxiliary storage unit 105 of the client computer, read out by the RAM 1022, and executed by the CPU 101.

The print processing includes prompting the user to input information by displaying a pop-up dialog. In step S601, the printer driver 1052 acquires drawing data 3011 and the print setting 3012 from the application 1051.

In step S602, the printer driver 1052 determines whether the setting for a pop-up dialog prompting the user to input information, which is previously performed in advance via the driver UI illustrated in FIG. 5, is included in the print setting 3012 acquired from the application 1051. Such a dialog is displayed when, for example, the secure print function is used. When this secure print function is used, the user is prompted to input a user name and a password. When the information is input, authentication is performed by the printer. In step S602, if the printer driver 1052 determines that the setting for a pop-up dialog prompting the user to input information is not included in the print setting 3012 (NO in step S602), the processing proceeds to step S610 without displaying the pop-up UI. In step S610, the printer driver 1052 converts the print setting 3012 and the drawing data 3011 into PDL data and executes printing. On the other hand, in step S602, if the printer driver 1052 determines that the setting for a pop-up dialog is included in the print setting 3012 (YES in step S602), the processing proceeds to step S603.

Figure 7:
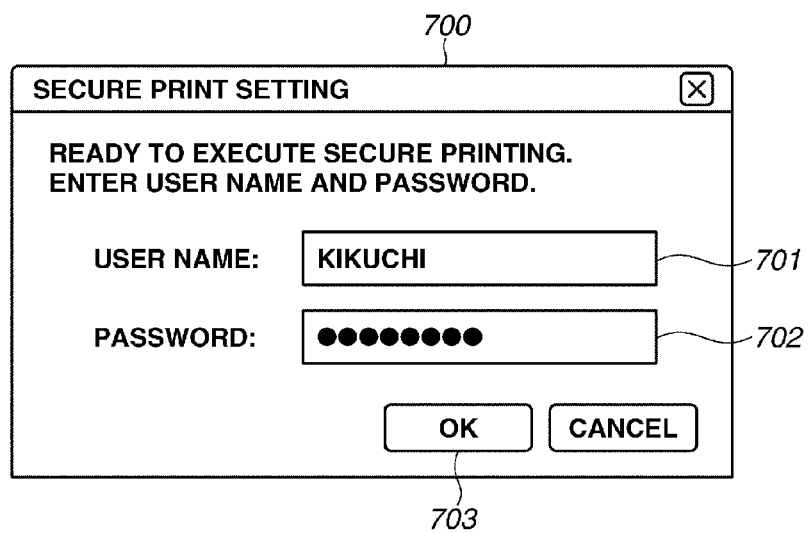
FIG. 7 illustrates an example of a pop-up user interface used for secure print according to the first exemplary embodiment.

In step S603, the printer driver 1052 displays on the desktop UI 900 a pop-up dialog prompting the user to input information. An example of a UI displaying a pop-up dialog prompting the user to input information (hereinafter referred to as a pop-up UI) according to the present exemplary embodiment is illustrated in FIG. 7. FIG. 7 illustrates a pop-up UI 700 for the secure print function. Before the secure print is executed, the user is prompted to input a user name 701 and a password 702 so that the printer can perform the authentication before the print product is actually output.

In step S604, the printer driver 1052 acquires information on the application which is the print source. For example, the printer driver 1052 makes a request to the OS and refers to identification information to acquire the information on the application from the OS. In step S605, the printer driver 1052 determines whether the application is operable on the touch-panel UI 1000 from the information on the application acquired in step S604. If the application is not operable on the touch-panel UI 1000 (NO in step S605), the processing proceeds to step S609.

In step S609, the printer driver 1052 determines whether the user name 701 and the password 702 have been input and an O button 703 has been pressed via the pop-up UI 700 illustrated in FIG. 7. In step S609, if the printer driver 1052 determines that the OK button 703 has not yet been pressed (NO in step S609), the printer driver 1052 waits for the OK button to be pressed. On the other hand, if the printer driver 1052 determines that the OK button 703 has been pressed (YES in step S609), the processing proceeds to step S610. In step S610, the printer driver 1052 converts the print setting 3012 including the information such as the user name 701 and the password 702 and the drawing data 3011 into PDL data and generates print data. The generated data is transmitted to an image forming apparatus such as a printer, and the data is printed according to the above-described setting.

In step S605, if the printer driver 1052 determines that the application is operable on the touch-panel UI 1000 (YES in step S605), the processing proceeds to step S606. In this case, when the popup UI is displayed in step S603, the OS 1053 displays the toast 1201 (see FIG. 12) prompting the user to tap the toast 1201 on the touch-panel UI 1000. In step S606, the printer driver 1052 determines whether the user name 701 and the password 702 are set to default values via the UI 700 in FIG. 7. If the user name 701 and the password 702 are set to default values (YES in step S606), the processing proceeds to step S607. If the user name 701 and the password 702 are not set to default values (NO in step S606), the processing proceeds to step S609.

In step S607, the printer driver 1052 determines whether the OK button 703 of the pop-up UI 700 illustrated in FIG. 7 has been pressed. If the printer driver 1052 determines that the OK button 703 has not yet been pressed (NO in step S607), the processing proceeds to step S608. On the other hand, if the printer driver 1052 determines that the OK button 703 has been pressed (YES in step S607), the processing proceeds to step S610.

In step S608, the printer driver 1052 determines whether a predetermined period of time has passed with no focus received on the pop-up UI 700 (in other words, with no user operation performed or with no user operation detected on the pop-up UI 700) since the pop-up UI 700 has been displayed on the desktop UI 900. The predetermined period of time may be registered and set in advance for the printer driver 1052 or set by the user via the driver UI illustrated in FIG. 5. Further, the printer driver 1052 can acquire the above-described toast display time and set the time as the predetermined period of time.

In step S608, if the printer driver 1052 determines that the predetermined period of time has not yet passed (NO in step S608), the processing returns to step S607. On the other hand, if the printer driver 1052 determines that the predetermined period of time has passed (YES in step S608), the processing proceeds to step S610. In step S610, the printer driver 1052 converts the print setting 3012 including the information such as the user name 701 and the password 702 which have been set as the default values and the drawing data 3011 into PDL data and generates print data. The pop-up UI 700 displayed in step S603 is automatically closed by the printer driver.

Although the flowchart in FIG. 6 has been described with reference to the pop-up UI 700 of the secure print function illustrated in FIG. 7, similar processing can be performed by a device driver function that displays a pop-up dialog during the print processing after the printing has been instructed by the user.

Figure 14:
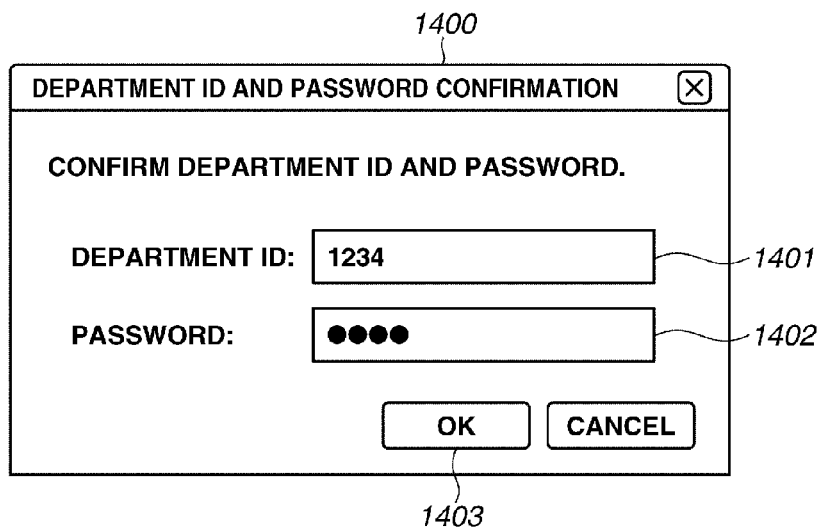
FIG. 14 illustrates an example of a pop-up user interface used for a departmental management function according to the first exemplary embodiment.

As another example, a pop-up UI of the departmental management function of the printer driver 1052 is illustrated in FIG. 14. If the use of the departmental management function is set in advance and printing is instructed, the printer driver 1052 displays a UI 1400. Then, the user inputs a department ID 1401 and a password 1402. As is the case in printing started when the OK button 703 illustrated in FIG. 7 is pressed, printing is started when an OK button 1403 in FIG. 14 is pressed.

Figure 15:
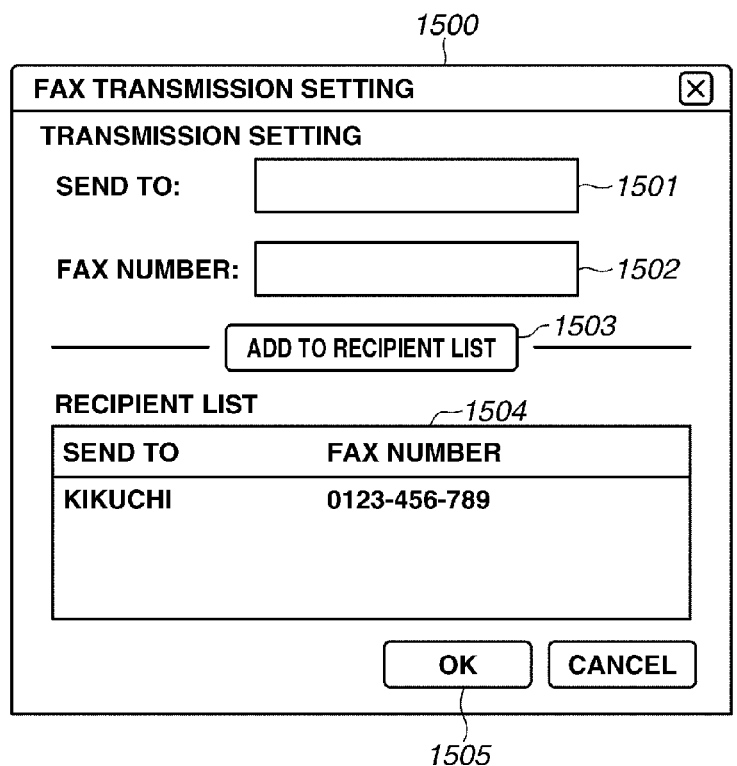
FIG. 15 illustrates an example of a pop-up user interface used for a facsimile transmission function.
Figure 16:
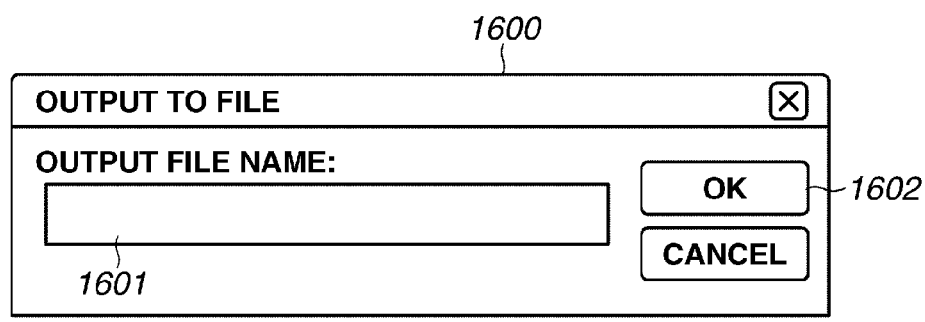
FIG. 16 illustrates an example of a pop-up user interface used for a file output function.

As yet another example, a pop-up UI of a facsimile transmission function of a facsimile driver is illustrated in FIG. 15. When the user inputs an address name 1501 and a facsimile number 1502 and presses an add-to-recipient-list button 1503, the destination of the facsimile is determined. Then, if the user presses an OK button 1505, the facsimile transmission is started. Furthermore, yet another example of a pop-up UI of a file storage function of a printer driver is illustrated in FIG. 16. When the user inputs an output file name 1601 such as a file path via a UI 1600 and presses an OK button 1602, the storage of the file is started.

According to the processing illustrated in FIG. 6, even if the focus is not received on the pop-up UI of the desktop UI 900, the printing is automatically executed after a predetermined period of time elapses. Thus, even if the user overlooks the toast 1201, the print processing is not suspended. This indicates that even if the user does not fully understand the display function for the OS, the function of the printer driver can be appropriately executed.

According to the first exemplary embodiment, whether the user name 701 and the password 702 are set to default values is determined in step S606, in order to determine whether to automatically execute the printing after the elapse of a predetermined period of time. According to a second exemplary embodiment of the present invention, the user is asked to determine whether to perform automated execution of the printing after the elapse of a predetermined period of time.

Figure 13:
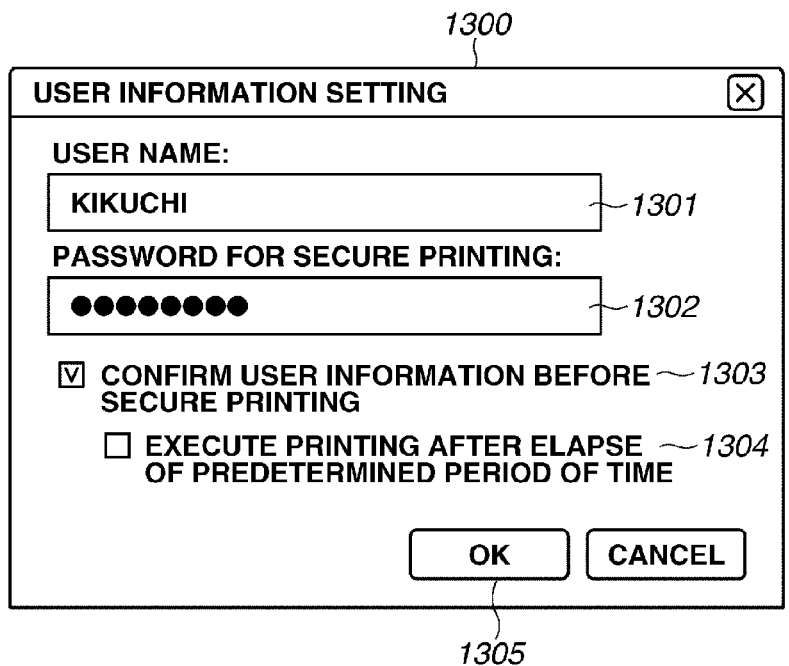
FIG. 13 illustrates an example of a user interface used for setting a secure print function according to the second exemplary embodiment.

FIG. 13 illustrates a UI 1300 displayed by the printer driver 1052. The user is asked to set in advance a user name 1301 and a password 1302 to be set as the default values for the secure print function. This UI is displayed on a desktop UI. As described above, the setting performed by the user is stored in the registry database 308 of the OS 1053 by the printer driver 1052 as an environment setting for each user. If the secure print function is enabled, the printer driver 1052 displays the pop-up UI 700 after the execution of printing is instructed via the application. When the pop-up UI 700 is displayed, the user name which has been input in the field of the user name 1301 is set in the field of the user name 701 and the password which has been input in the field of the password 1302 is set in the field of the password 702.

Additionally, the UI 1300 illustrated in FIG. 13 includes a check box 1303 which is used for determining whether the user information is to be confirmed before the secure print is performed. If the user clears the check box 1303, the pop-up will not appear before the secure print is performed. On the other hand, if the user checks the check box 1303, the user can confirm and input information such as a user name in the above-described pop-up dialog before the secure print is performed. The check box 1303 may be controlled by the printer driver 1052 such that the box cannot be cleared if the valid user name 1301 and the valid password 1302 have not been input.

According to the second exemplary embodiment, the UI 1300 further provides a check box 1304 which is used when the user designates whether the printing is to be executed after the elapse of a predetermined period of time.

The check box 1304 is controlled by the printer driver 1052 in such a manner that the check box 1304 can be checked (or cleared) only when the check box 1303 ("confirm user information before secure printing") is checked. If the user checks the check box 1304, the printer driver automatically executes the secure printing when a predetermined period of time has passed since the pop-up UI 700 has been displayed on the desktop UI. The check box 1304 is controlled by the printer driver 1052 such that the check box 1304 cannot be checked if the valid user name 1301 and the valid password 1302 have been input. Further, it is desirable to set a sufficiently long time as the predetermined period time compared to the toast display time described above. Basically, this predetermined period of time is managed by the printer driver 1052, but the period of time can also be set by the user.

Next, processing of the printer driver 1052 according to the present exemplary embodiment will be described in detail with reference to the flowchart in FIG. 8.

Figure 8:
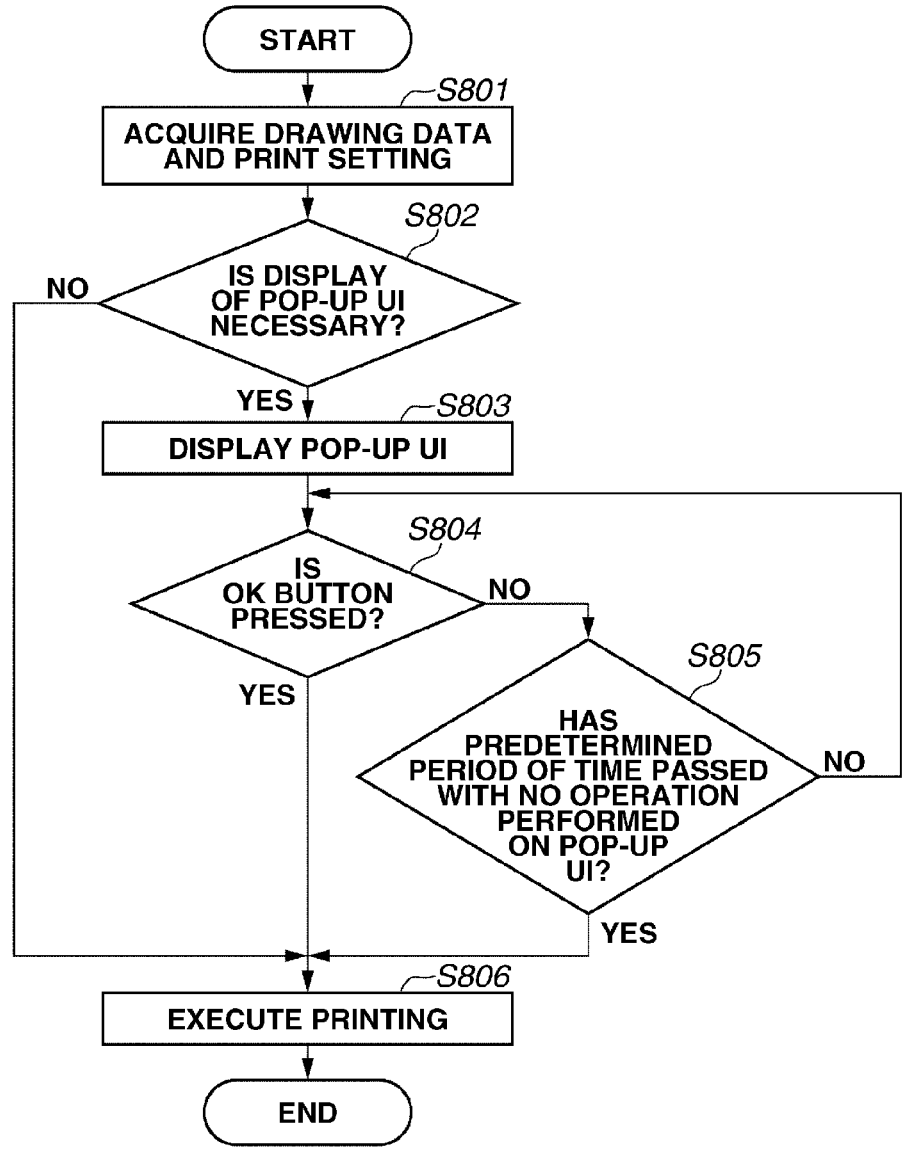
FIG. 8 is a flowchart illustrating the print processing using the printer driver according to a second exemplary embodiment of the present invention.

The flowchart in FIG. 8 is performed in a case where the check box 1303 ("confirm user information before secure printing") and the check box 1304 ("execute printing after elapse of predetermined period of time") are checked on the UI 1300 in FIG. 13.

Since steps S801 to S803 are similar to steps S601 to S603 in FIG. 6, descriptions thereof are omitted In step S804, the printer driver 1052 determines whether the OK button 703 of the pop-up UI 700 for the secure print has been pressed as is the case performed in step S607. If the OK button 703 has been pressed (YES in step S804), the processing proceeds to step S806. If the OK button 703 has not yet been pressed (NO in step S804), the processing proceeds to step S805.

Processing in step S805 is similar to the processing in step S608. Th t is, the printer driver 1052 determines whether the predetermined period of time has passed with no user operation performed on the pop-up 700 since the pop-up UI 700 of the secure print has been displayed on the desktop UI 900. In step S805, if the printer driver 1052 determines that the predetermined time has passed (YES in step S805), the processing proceeds to step S806. If the printer driver 1052 determines that the predetermined period of time has not yet passed (NO in step S805), the processing returns to step S804.

In step S806, the printer driver 1052 converts the print setting 3012 including information such as the user name 701 and the password 702 set on the UI and the drawing data 3011 into PDL data and generates print data. The generated data is transmitted to an image forming apparatus such as a printer. Then, the data is printed according to the above-described setting.

By using the UI 1300 illustrated in FIG. 13, the user can designate whether to perform automated printing after a predetermined time, so that the user can have more options. As described in the first exemplary embodiment, various functions require the pop-up UI. Since the processing performed after the elapse of a predetermined period of time can be designated for each function, the device driver can provide a detailed support to the user.

For example, if a file output instruction is provided as illustrated in FIG. 16, the processing may be cancelled after the elapse of a predetermined period of time. Further, if a facsimile transmission instruction is provided as illustrated in FIG. 15, in order to prevent transmission error, automatic transmission may not be performed until the user inputs necessary information. Furthermore, when the user designates automatic printing execution after the elapse of a predetermined period of time, as is the case performed in the first exemplary embodiment, the functions of the printer driver can be appropriately executed even if the user does not fully understand the display function for the OS.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-013039 filed Jan. 25, 2012, which is hereby incorporated by reference herein in its entirety.

The invention claimed is:

1. An information processing apparatus including a control unit configured to execute an operating system (OS) providing a first user interface environment appropriate for a touch panel and a second UI environment different from the first UI environment and a device driver configured to control an image forming apparatus, the information processing apparatus comprising:
   a setting unit configured to set, in advance, information to be set via a pop-up dialog in the second UI environment as a function of the device driver, before a request to the image forming apparatus is executed;
   a control unit configured to pop up the dialog in the second UI environment as a function of the device driver according to execution of the request to the image forming apparatus; and
   an execution unit configured to execute processing regarding the request by using the information set by the setting unit if an operation by a user on the pop-up dialog, according to execution of the request by an application operating in the first UI environment, in the second UI environment is not performed for a predetermined period of time,
   wherein, according to the pop-up dialog in the second UI environment, a toast prompting the user to change the first UI environment to the second UI environment is displayed for a predetermined period of time in the first UI environment, as a function of the OS, and
   wherein the predetermined period of time is longer than a display time for the toast, which is displayed as a function of the OS.

2. The information processing apparatus according to claim 1, wherein if the operation by the user on the pop-up dialog in the second UI environment is not performed for the predetermined period of time, the setting unit is able to set whether the processing regarding the request is to be automatically executed by using the information set by the setting unit.

3. The information processing apparatus according to claim 1, wherein the pop-up dialog in the second UI environment includes a screen for inputting information about at least one of user information, authentication information, department information, file path, and address information.

4. The information processing apparatus according to claim 1, wherein the operation by the user on the pop-up dialog in the second UI environment indicates that a focus is received on the pop-up dialog.

5. A method for an information processing apparatus that runs an operating system (OS) providing a first user interface environment appropriate for a touch panel and a second UI environment different from the first UI environment and a device driver configured to control an image forming apparatus, the method comprising:
   setting, in advance, information to be set via a pop-up dialog in the second UI environment as a function of the device driver, before a request to the image forming apparatus is executed;
   popping up the dialog in the second UI environment as a function of the device driver according to execution of the request to the image forming apparatus; and
   executing processing regarding the request by using the set information if an operation by a user on the pop-up dialog, according to execution of the request by an application operating in the first UI environment, in the second UI environment is not performed for a predetermined period of time,
   wherein, according to the pop-up dialog in the second UI environment, a toast prompting the user to change the first UI environment to the second UI environment is displayed for a predetermined period of time in the first UI environment, as a function of the OS, and
   wherein the predetermined period of time is longer than a display time for the toast, which is displayed as a function of the OS.

6. A non-transitory computer readable storage medium on which is stored a computer program that when executed, causes a computer to perform a method for an information processing apparatus that runs an operating system (OS) providing a first user interface environment appropriate for a touch panel and a second UI environment different from the first UI environment and a device driver configured to control an image forming apparatus, the method comprising:
   setting, in advance, information to be set via a pop-up dialog in the second UI environment as a function of the device driver, before a request to the image forming apparatus is executed;
   popping up the dialog in the second UI environment as a function of the device driver according to execution of the request to the image forming apparatus; and
   executing processing regarding the request by using the set information if an operation by a user on the pop-up dialog, according to execution of the request by an application operating in the first UI environment, in the second UI environment is not performed for a predetermined period of time,
   wherein, according to the pop-up dialog in the second UI environment, a toast prompting the user to change the first UI environment to the second UI environment is displayed for a predetermined period of time in the first UI environment, as a function of the OS, and
   wherein the predetermined period of time is longer than a display time for the toast, which is displayed as a function of the OS.

* * * * *